Patented Nov. 30, 1948

2,455,256

UNITED STATES PATENT OFFICE 2,455,256

ANTIOXIDANT

Charles I. Jarowski, Springfield, Pa., assignor to Wyeth Incorporated, Philadelphia, Pa., a corporation of Delaware No Drawing. Application August 24, 1946, Serial No. 692,929

5 Claims. (Cl. 260—398.5)

This invention relates to a new antioxidant and more particularly relates to the stabilization of oxidizable organic substances, primarily those containing animal and vegetable fats and oils.

It is known that materials containing animal, fish and vegetable oils and fats tend to become rancid and in some cases discolor during storage, and it is believed that a governing factor is due in large measure to oxidation. It is also known that organic substances containing unsaturated linkages such as polymer products, insecticides such as pyrethrum and mineral oils containing unsaturated fractions such as motor fuels, deteriorate and lose their value due to oxidative changes. Obviously, deterioration due to oxidative changes is highly objectionable and many attempts have been made to overcome such deterioration by incorporating various antioxidants in said materials which inhibit and retard oxidative changes. Among the proposed materials which have been suggested as antioxidants when added to materials tending to become rancid or oxidized are such substances as eugenol, guaiacol, syringic acid, vanillic acid and nordihydroguaiaretic acid hereinafter abbreviated for easier reference to its commonly used initials N-D-G-A. While some of these substances have been found useful, they have not proven to be entirely satisfactory due to either their low protective action or to their expense or for both of these reasons.

A new antioxidant has been found which is highly potent in its protective action against deteriortion and rancidity and which is relatively inexpensive when compared to present-day antioxidants.

An object of the invention is to provide an antioxidant for oxidizable organic substances.

A further object is to provide a stabilizer for substances normally tending to deteriorate by oxidation.

A still further object is to provide an antioxidant for edible substances such as foods, medicinals and pharmaceutical products containing animal and vegetable fats and oils.

These objects are accomplished by incorporating in a material which normally tends to deteriorate or become rancid a small amount, sufficient to inhibit deterioration or rancidity, of diisoeugenol, having the formula $C_{20}H_{24}O_4$.

The compound is prepared by dissolving 100 grams of isoeugenol in 200 cc. of absolute ethanol. Hydrochloric acid is bubbled into the solution which is heated under refluxing conditions for two hours. After the reaction is complete, the solution is cooled in an ice bath and the white, crystalline precipitate is separated. The melting point of the crystalline solid is 182–183° C.

The materials which can be stabilized successfully by this new antioxidant are such substances which normally tend to deteriorate or become rancid due to oxidative changes and since the antioxidant is non-toxic at levels necessary to confer stability against oxidation, it is particularly useful as an antioxidant for pharmaceuticals, medicinals and edible substances.

A particular important field of use for diisoeugenol is in the protection against oxidative changes afforded to edible substances containing animal and vegetable oils and fats. Edible materials which can be successfully stabilized by this antioxidant are such substances as poultry, meats, fish, sea-food, vegetables, cereals, grain and grain products, and compositions containing them. In addition, dried tea, cocoa, chocolate, coffee and coffee products can also be stabilized. The antioxidant is also effective for sauces, dried eggs, salad dressings, milk and milk products, such as dried milk or dried skimmed milk containing added fats or oils, butter, cream and ice-cream. Moreover, the antioxidant retards development of rancidity in such materials as pastries, cooked or fried edible materials. Protection against rancidity is afforded such substances as lard, beef tallow, butter, cocoa butter, peanut oil, cottonseed oil, linseed oil, cocoanut oil, palm oil, olive oil, corn oil, castor oil, soya bean oil, sesame seed oil and hydrogenated animal and vegetable oils generally used in or for foodstuffs. Marine oils, such as shark liver, halibut liver, cod liver and other marine oils or other oils or fats which are generally used in medicinal preparations are likewise protected against rancidity.

The concentration in which the antioxidant is used will vary with the degree of stabilization desired and with the kind of material to be stabilized. In general, the concentration may range from about 0.04% to about 5% by weight, based on the material to be stabilized.

Table I serves to illustrate the antioxigenic activity of diisoeugenol, the data being based on assays of the ability of the particular antioxidant to maintain the iodine number of a mixture of 2 grams of purified linoleic acid (iodine number over 160) and 10 grams of corn starch at a temperature of 37° C.

*Table I*

| Antioxidant | Amount per cent by Weight | Iodine Number | | | | | | | |
|---|---|---|---|---|---|---|---|---|---|
| | | 1 Week | 2 Weeks | 3 Weeks | 4 Weeks | 5 Weeks | 6 Weeks | 7 Weeks | 8 Weeks |
| Blank | | 45 | 32 | | | | | | |
| Diisoeugenol | 0.04 | 125 | 96 | 55 | | | | | |
| Do | 0.16 | 140 | 135 | 121 | 118 | | | | |
| Do | 0.20 | 134 | 135 | 120 | 112 | 117 | 114 | 118 | 100 |
| Do | 1.00 | 175 | 159 | 160 | 152 | | | | |
| Do | 5.00 | | 148 | 172 | 150 | | | | |

It will be noted from Table I that diisoeugenol is effective as an antioxidant in an amount as low as 0.04% by weight, and its effectiveness is increased by higher percentages, the table showing tests to as high as 5%. It should be mentioned that the table shows the tests carried out at the 1% and 5% levels only up to 4 weeks and no further tests were carried out beyond this period. The other tests at lower levels were carried out for 8 weeks, as shown.

Table II illustrates the effectiveness of diisoeugenol as compared to other known antioxidants, the assays being carried out in the same manner for all materials and as indicated for Table I.

*Table II*

| Antioxidant | Amount per cent by Weight | Iodine Number | | | | | | | |
|---|---|---|---|---|---|---|---|---|---|
| | | 1 Week | 2 Weeks | 3 Weeks | 4 Weeks | 5 Weeks | 6 Weeks | 7 Weeks | 8 Weeks |
| Blank | | 45 | 32 | | | | | | |
| Diisoeugenol | 0.04 | 125 | 96 | 55 | | | | | |
| Isoeugenol | 0.04 | 118 | 45 | 32 | | | | | |
| N-D-G-A | 0.04 | 120 | 45 | | | | | | |
| Diisoeugenol | 0.16 | 140 | 135 | 121 | 118 | | | | |
| N-D-G-A | 0.16 | 133 | 127 | 129 | 106 | | | | |
| Diisoeugenol | 0.20 | 134 | 135 | 120 | 112 | 117 | 114 | 118 | 100 |
| N-D-G-A | 0.20 | 130 | 134 | 118 | 52 | 48 | | | |
| Isoeugenol | 0.20 | 118 | 113 | 48 | 32 | | | | |
| Syringic Acid | 0.20 | 147 | 131 | 85 | 60 | | | | |

A study of Table II clearly shows diisoeugenol to be superior as an antioxidant to nordihydroguaiaretic acid (N. D. G A.) and far superior to isoeugenol and syringic acid. The table shows N. D. G. A. to have totally lost its antioxygenic effect after the fourth week at the 0.2% level while diisoeugenol still maintained its effectiveness at the eighth week.

The superiority of diisoeugenol is further evidenced by the fact that it is relatively cheaper to prepare than nordihydroguaiaretic acid, and is non-toxic at the levels required to effectively stabilize edible materials.

I claim:

1. A composition of matter comprising a material normally subject to oxidative changes containing a minor proportion, effective as an antioxidant, of diisoeugenol.

2. A material normally subject to oxidative rancidity containing a minor proportion, effective as an antioxidant, of diisoeugenol.

3. A composition comprising an oleaginous material in which is included a small amount of diisoeugenol.

4. Animal and vegetable fats and oils normally tending to become rancid containing a proportion, effective as an antioxidant, of diisoeugenol.

5. A process for retarding the development of rancidity in animal and vegetable fats and oils and compositions containing them, comprising incorporating therein diisoeugenol, in a proportion effective to inhibit the development of rancidity.

CHARLES I. JAROWSKI.

REFERENCES CITED

The following references are of record in the file of this patent:

UNITED STATES PATENTS

| Number | Name | Date |
|---|---|---|
| 2,064,610 | Hunt | Dec. 15, 1936 |
| 2,373,192 | Lauer | Apr. 10, 1945 |